United States Patent

Carney

[11] Patent Number: 5,709,609
[45] Date of Patent: Jan. 20, 1998

[54] TRAINING APPARATUS FOR GOLFERS

[76] Inventor: William P. Carney, 4 High Ridge La., Oyster Bay, N.Y. 11771

[21] Appl. No.: 572,867

[22] Filed: Dec. 14, 1995

Related U.S. Application Data

[63] Continuation-in-part of Ser. No. 543,442, Oct. 16, 1995, Pat. No. 5,611,739.
[51] Int. Cl.$^6$ .................................................. A63B 69/36
[52] U.S. Cl. .................................. 473/220; 362/259
[58] Field of Search ............................. 473/220; 362/259

[56] References Cited

U.S. PATENT DOCUMENTS

| | | | |
|---|---|---|---|
| 5,165,691 | 11/1992 | Cook | 473/220 |
| 5,213,331 | 5/1993 | Avanzini | 473/220 |
| 5,388,832 | 2/1995 | Hsu | 473/220 |

*Primary Examiner*—George J. Marlo
*Attorney, Agent, or Firm*—Charles E. Temko

[57] ABSTRACT

A self-contained laser device is removably affixed on selected golf apparatus, such as a putter. The laser device includes a laser housing having a bore in which a laser module is mounted such that the laser module emits a laser beam through an opening in the bore coincident with the axis of the bore. A switch means is within said bore for activating the laser module.

A support member having an upper and a lower portion is provided. The lower portion includes structure for removably affixing and aligning the support member on selected golf apparatus.

The upper portion includes structure for removably affixing and aligning the laser housing on the support member such that when the laser device is removably affixed to a selected golf apparatus, the laser beam is emitted in a predetermined optimum direction with respect to the golf apparatus.

22 Claims, 8 Drawing Sheets

TRAINING APPARATUS FOR GOLFERS

CROSS REFERENCE TO RELATED APLLICATION

This is a continuation-in-part of my U.S. patent application Ser. No. 08/543,442 filed Oct. 16, 1995, now U.S. Pat. No. 5,611,739.

BACKGROUND OF THE INVENTION

1. Field of the Invention

This invention relates to laser aiming devices and more particularly to novel mounting arrangements for removably affixing self-contained laser devices on a variety of golf apparati employed to enhance golf training and practice.

2. Description of Related Art

There is a well known need in the golf industry for various training apparati which incorporate laser aiming devices for enhancing the practice of different aspects of the game of golf. For example, golf club laser aiming systems which provide golf club putters with laser beams for practicing proper club face alignment are generally accepted by golfers as a valuable training aid. In addition, laser devices attached to golf hats are employed by golfers to focus their attention on the golf ball and to monitor their head movement during golf strokes.

The above mentioned training applications highlight the need for a self-contained laser device having a mounting arrangement which can accommodate various golf apparati for easily removably affixing the laser devices thereon. However, these needs raise certain problems because lasers normally include a laser emitting diode and an electronic control circuit which are relatively expensive and somewhat fragile. As previously noted, training applications require mounting the laser on apparati such as golf clubs or golf hats routinely employed on a golf course where they are exposed to dust and moisture laden ambient conditions. It is important in these applications that the laser emitter is mounted in a housing which substantially seals and protects the emitter and its associated control circuit from the effects of an outdoor golf course environment. Further, there is a problem associated with providing a housing which can removably affix the laser device on a selected golf apparatus without having to modify the apparatus with holes or the like and yet provide a means by which to align the laser in an optimum direction with respect to the selected golf apparatus.

Self-contained, hand held laser devices which generate a laser beam for use as a pointer are also known in the art and widely used in numerous applications. Typically, a hand held pointer is designed to look like a writing pen and includes a pocket clip for not only securing the pen-like device in a shirt pocket but also for acting as a switch to turn on the laser. Self-contained laser beam generators are produced in substantial quantities to meet a well established demand for general-purpose pointer applications. To provide flexibility and cost effectiveness, there is a need for a mounting arrangement to interchangeably install a general-purpose pointer on any one of the golf training devices previously described so that a general-purpose pointer may be employed on a variety of golf training devices thereby utilizing a single laser source for a multitude of applications.

The following United States Patents show prior art laser devices to which the present invention is applicable:

U.S. patent application Ser. No. 08/543,442 filed Oct. 16, 1995, discloses a novel arrangement for removably affixing a laser aiming device to a golf club putter. The putter includes a head having a transversely extending generally planar front face and a generally planar rear portion formed substantially parallel to the front face and spaced apart therefrom. A laser housing having a laser module mounted therein is removably affixed to the head. The head is clamped between an alignment surface formed in the housing which engages the front face and a clamping element affixed to the housing which provides biased contact against the rear portion such that a laser beam emitted by the laser module is aimed in a horizontal direction substantially perpendicular to the front face. A player employs the laser beam to properly align the club face during putting practice. This application, however, does not disclose a means by which the laser aiming device, as taught in the disclosure, may be removably affixed to other types of golf clubs and/or to other golf apparatus such as the golf hat for optimizing the use of the laser beam source.

U.S. Pat. No. 5,284,345 which issued on Feb. 8, 1994, to E. F. Jehn, discloses a mounting arrangement for affixing a laser device to a golf cap. Jehn's laser indicator includes a top shell and a bottom shell which are fastened to the visor of a golf player's cap. The laser module has a laser firing lens mount pivotably fastened to the top and bottom shell at the front and is controlled to project a laser beam on the golf ball to be hit by the golf player to help the golf player take the correct hitting position. Jehn's patent does not teach a means by which the laser module in the disclosure may be adapted to mount on training aids other than the disclosed visor thereby providing flexible and cost effective use of the relatively expensive laser emitter.

U.S. Pat. No. 5,121,188 which issued on Jun. 9, 1992, to William C. Patridge, discloses a self-contained laser module assembly including one application of the module in a pen-like pointer. The pointer has a pocket clip through which electrical contact is selectably made between the body of the pointer and a side contact on the module to cause a beam to be emitted. This disclosure, however, does not teach a means by which the pen-like pointer may be interchangeably used on a variety of different golf training apparatus thereby providing additional uses for the general-purpose, pen-like pointer.

As can be seen from the foregoing, there is a definite need for laser mounting arrangements which can be used to mount general-purpose laser devices on a selected golf apparatus employed for practicing golf in order to provide flexibility and optimum utilization of the laser emitters.

SUMMARY OF THE INVENTION

The present invention overcomes the above described problems and disadvantages and provides laser mounting arrangements which may be employed to removably affix laser devices on a selected golf apparatus used for practicing golf so as to provide flexibility and optimum utilization of the relatively costly laser emitter.

In a first embodiment, a self-contained laser device, removably affixed on a selected golf apparatus, comprises a laser housing having a bore in which a laser module is mounted such that the laser module emits a laser beam through an opening in the bore coincident with the axis of the bore. The laser device includes means for activating the laser module. Also included in the laser device is a support member having an upper and a lower portion. The lower portion includes means for removably affixing and aligning the support member on the selected golf apparatus and the upper portion includes means for removably affixing and aligning the laser housing on the support member such that when the laser device is removably affixed to the selected golf apparatus the laser beam is emitted in a predetermined optimum direction with respect to the selected golf apparatus.

In a second embodiment, the present invention includes an adapter for removably affixing a laser pointer on a selected golf apparatus. The laser pointer includes a casing, a laser module emitting a laser beam, a voltage source and a switch controlling the laser pointer. The adapter comprises a top segment and a bottom segment. The top segment defines a nest adapted to receive and align the pointer therein. Means for retaining the laser pointer in the nest are included in the adapter. The nest aligns the laser pointer such that the laser beam is emitted coincident with the axis of the nest. Means are included in the bottom segment for affixing the adapter to the selected golf apparatus such that when the laser pointer is removably affixed to the selected golf apparatus the laser beam is emitted in a predetermined optimum direction with respect thereto.

In a third embodiment, a self-contained laser device mounted on a selected golf apparatus comprises a laser pointer having a laser module, a voltage source and a switch, in which the switch turns on the module to emit a laser beam. A pointer enclosure has a bore adapted to removably affix the laser pointer therein so that the laser beam is emitted through an opening in the bore coincident with the axis of the bore. Means for activating the switch are included in the pointer enclosure. The pointer enclosure defines means for mounting the laser device on the selected golf apparatus such that when the laser device is mounted on the selected golf apparatus the laser beam is emitted in a predetermined optimum direction with respect to the selected golf apparatus.

In a fourth embodiment, the present invention includes an enclosure for removably mounting a pen-like laser pointer on the selected golf apparatus. The pen-like laser pointer includes a casing, a laser module emitting a laser beam, a voltage source and a switch controlling the laser pointer. The enclosure comprises an upper portion and a lower portion. The upper portion forms an inner cavity having a bore including access means for receiving the laser pointer therein. An opening is in a front side of the bore. The bore is adapted to removably mount the laser pointer therein such that the laser beam is emitted through the opening coincident with the axis of the bore. Means for retaining the laser pointer and means for activating the switch are located in the upper portion. Means are included in the lower portion for affixing the enclosure to a selected golf apparatus such that when the pen-like laser pointer is removably affixed to the selected golf apparatus the laser beam is emitted in a predetermined optimum direction with respect thereto.

DETAILED DESCRIPTION OF THE INVENTION

Figure 1:
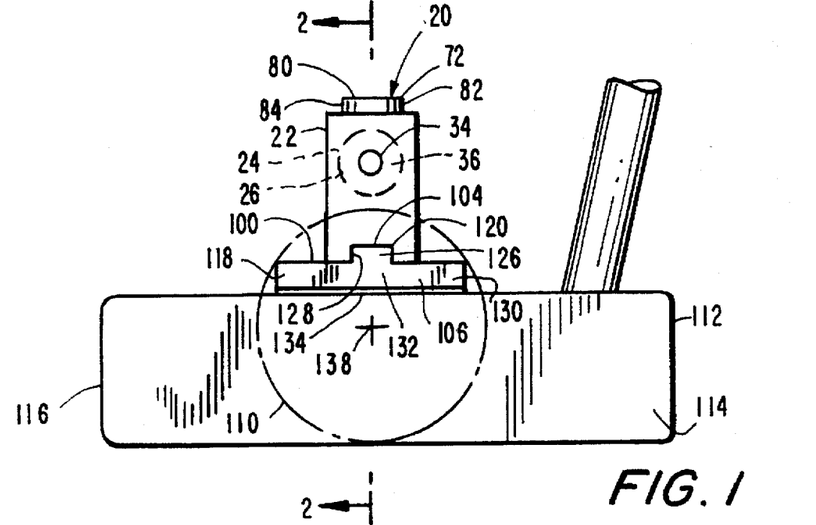
FIG. 1 is a front elevation of a first putter head having a self-contained laser aiming device mounted thereon by means of a first support member.
Figure 2:
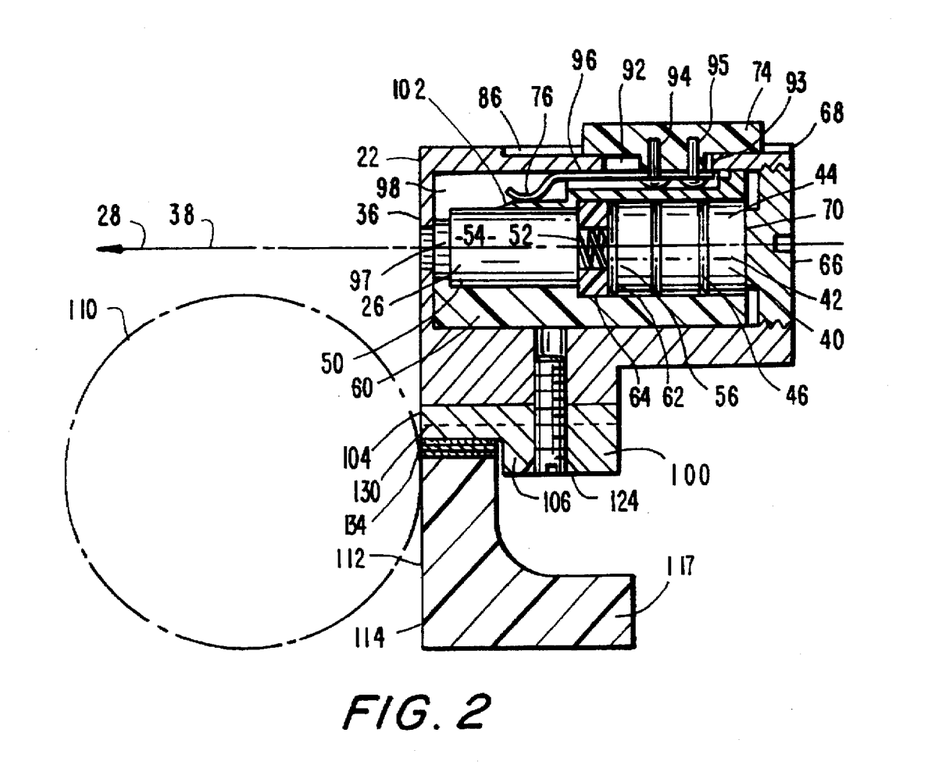
FIG. 2 is a sectional view of the first putter head shown in FIG. 1 taken along lines 2—2.

Turning now to the drawings, there is shown in FIGS. 1 and 2 a first embodiment of the present invention which includes a self-contained laser device generally referred to by reference number 20. The laser device 20 includes a laser housing 22 having a bore 24 formed therein for receiving and aligning a laser module 26 such that the laser module 26 emits a laser beam 28 through an opening 34 in a front side 36 coincident with the axis 38 of the bore 24. Also included in the laser housing 22 for activating the laser device 20 is a voltage source 40 comprising at least one battery 42 and a slide switch 72 for controlling the laser device 20. Any one of a number of well known materials such as, but not limited to, brass, aluminum or steel may be used to fabricate the laser housing 22 by employing typical fabricating processes such as numerically controlled milling or standard die casting techniques.

The laser module 26 utilized in the first embodiment is well known in the industry and may be purchased as an assembly having a first conductive surface, preferably a generally cylindrical shell 50, and having a second conductive surface, preferably a spring member 52. The shell 50 and the spring member 52 are used to couple first and second opposite polarity electrical potentials from the voltage source 42 to energize the laser module 26 wherein, preferably, the cylindrical shell 50 is a positive terminal 54 and the spring member 52 is a negative terminal 56. The laser module 26 is available from any one of a number of vendors such as Lyte Optronics, Santa Monica, Calif. and, as shown in FIG. 2, slidably fits into an insulating sleeve 60 located in the bore 24. The insulating sleeve 60 may be molded from any one of a number of well known plastic molding materials and electrically isolates the laser module from the metallic laser housing 22 and aligns the laser module 26 so that it projects its laser beam 28 through the opening 34 in the front side 36.

Also positioned in the insulating sleeve 60 is the voltage source 40 comprising a series connection of disc shaped batteries 42 which may be obtained from Duracell Corp., a well known provider of the 1.5 volt micro alkaline batteries shown in FIG. 2 wherein each battery has an outer casing which is a positive pole 44 and a centrally disposed disc-like negative pole 46. A negative termination 62 of the voltage source 40 contacts the spring member 52 fitted in a cylindrical insulating washer 64 which is slidably inserted into the insulating sleeve 60 and supports the spring member 52. An electrically conductive metallic cap 66 threadedly engages a rear portion 68 of the housing 22 and contacts a positive termination 70 of the voltage source 40 adjacent the cap 66 thereby maintaining, in biased contact, the positive termination 70 of the voltage source 40 with the conductive cap 66 and thus, the conductive housing 22.

The slide switch 72 is located in this housing 22 and is normally activated by a user's thumb to turn on and turn off the laser aiming beam 28 during putting practice and comprises a slide element 74, preferably fabricated from a plastic resin, and a switch contact 76 manufactured from an electrically conductive resilient material such as, but not limited to, spring tempered stainless steel. The slide element 74 has a serrated top surface 80 and first 82 and second 84 laterally extending parallel sides which fit slidably into a guideway 86 formed in the laser housing 22. Also formed in the laser housing is a guide slot 92 in which a lower section 93 of the slide element 74 is guided. As shown in FIG. 2, the slide switch 72 fits snugly in the guideway 86 and is held in biased contact thereto by the rivets 94 and 95 thereby providing a substantially sealed switch arrangement. In addition, a lens 97 may be installed in the front side 36 to substantially seal the opening 34. Affixed to the slide element 74 by known fastening techniques such as the first rivet 94 and the second rivet 95 is the switch contact 76 which makes an electrical connection with the laser housing 22 along an interface 96 between the laser housing 22 and the switch contact 76.

As shown in FIGS. 1 and 2, the switch contact 76 operates in an opening 98 formed in the insulating sleeve 60 and when the slide element 74 is urged forward from its off position to turn on the laser module 26, the switch contact 76 rides down a ramp section 102 formed in the insulating sleeve 60. By moving the switch contact 76 into biased contact with the cylindrical shell 50, a series electrical circuit between the voltage source 40 and the laser module 26 is completed so as to turn on the laser aiming beam 28. In reverse manner, the laser beam 28 is turned off by moving the slide switch 72 back to the off position wherein the switch contact 76 is electrically insulated from the cylindrical shell 50 by the ramp section 102.

The laser device 20 may be removably affixed to different selected golf apparati such as, but not limited to, various types of putter heads. As will be described in more detail below, support members generally referred to by reference number 100 are used to mount the laser housing 22 on the selected golf apparatus. Each support member 100 has an upper portion 104 for affixing and aligning the laser housing 22 thereon and each has a lower portion 106 for affixing and aligning each support member 100 to the selected golf apparatus.

Unlike the prior art, the first embodiment provides a mounting arrangement by which the laser device 20 may be removably affixed to a variety of golf apparati and aligned in a predetermined optimum direction with respect thereto. For example, when affixing the laser device 20 on a typical putter head, the mounting arrangement of the present invention ensures that the laser aiming beam 28 is emitted in a horizontal direction substantially perpendicular to the impact surface of the typical putter head above a golf ball 110 in position to be putted. As will be described in more detail below, the above mentioned optimum direction is predetermined by the alignment of the laser module 26 with respect to the bore 24, the alignment of the bore 24 with respect to the upper portion 104 of the support member 100 and the alignment of the lower portion 106 of the support member 100 with respect to the selected golf apparatus. It is important to note that the mounting arrangement of the present invention does not require any modification of the selected golf apparatus.

The first selected golf apparatus shown in FIGS. 1 and 2 comprises a first putter head 112 having a transversely extending generally planar front surface 114 for striking the golf ball 110 which is illustrated in phantom adjacent the front surface 114 in position to be putted. Also included as part of the first putter head 112 is a substantially horizontal planar top section 116 and a rear portion 117 formed normal to the front surface 114. A first support member 118 defines a first upper portion 120 including a means by which to removably affix and align the laser housing 22 thereon. FIGS. 1 and 2 delineate a preferred method disclosed in the first embodiment which includes a screw 124, a tongue 126 and a groove 128 to affix and align the laser device 20 on the first support member 118. Those skilled in the art are familiar with alternate methods such as, but not limited to, an interlock fit between the tongue 126 and the groove 128 which eliminates the need for the screw 124.

As herein before mentioned, the laser housing 22 may be manufactured using any one of a number of electrically conductive materials formed by known manufacturing processes to produce the laser housing 22 deflating with substantial precision the bore 24 and the groove 128. The first support member 118 may be manufactured from either an electrically conductive material such as described above or from an insulative plastic resin preferably molded to form therein, with substantial precision, the tongue 126 on the first upper portion 120 and a reference surface 130 on a first lower portion 132.

The screw 124 removably affixes the laser device 20 to the first support member 118 and the tongue 126 and the groove 128 precisely align the two components 22 and 118 thereby precisely aligning the laser beam 28 with respect to the reference surface 130. A short length of double sided tape 134 may be used to removably affix the first lower portion 132 of the first support member 118 to the generally planar top section 116 of the first putter head 112. Preferably, a commonly available alignment tool (not shown) such as a ruler having a straight edge and at least one generally planar surface may be employed by a player to align the reference surface 130 of the first support member 118 with respect to the front surface 114 of the first putter head 112 so that the laser beam 28 is emitted in a substantially horizontal direction perpendicular to the front surface 114. The opening 34 is visually positioned by the player above a point 138 on the front surface 114 where the player prefers to strike the golf ball 110 such that the laser beam 28 is projected above the golf ball 110 when it is in position to be putted. The player uses the laser beam 28 to ensure proper club alignment during putting practice.

Figure 3:
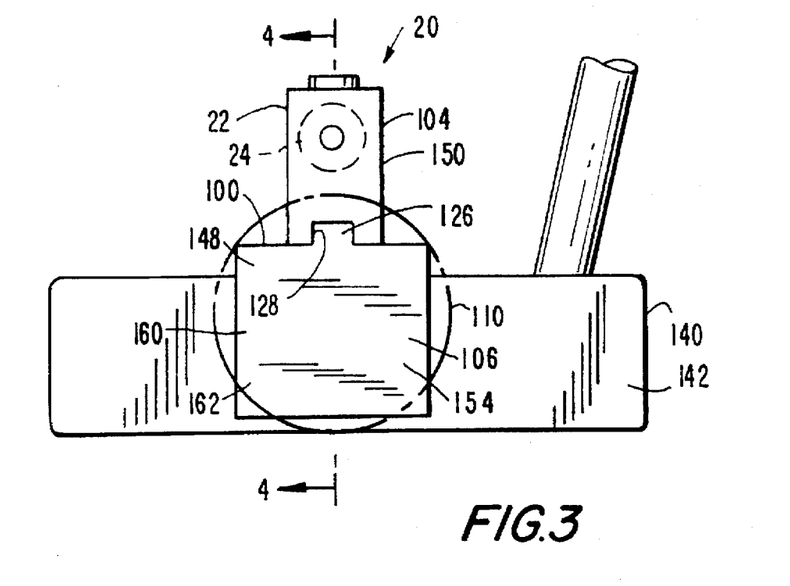
FIG. 3 is a front elevation of a second putter head having a self-contained laser device mounted thereon by means of a second support member.
Figure 4:
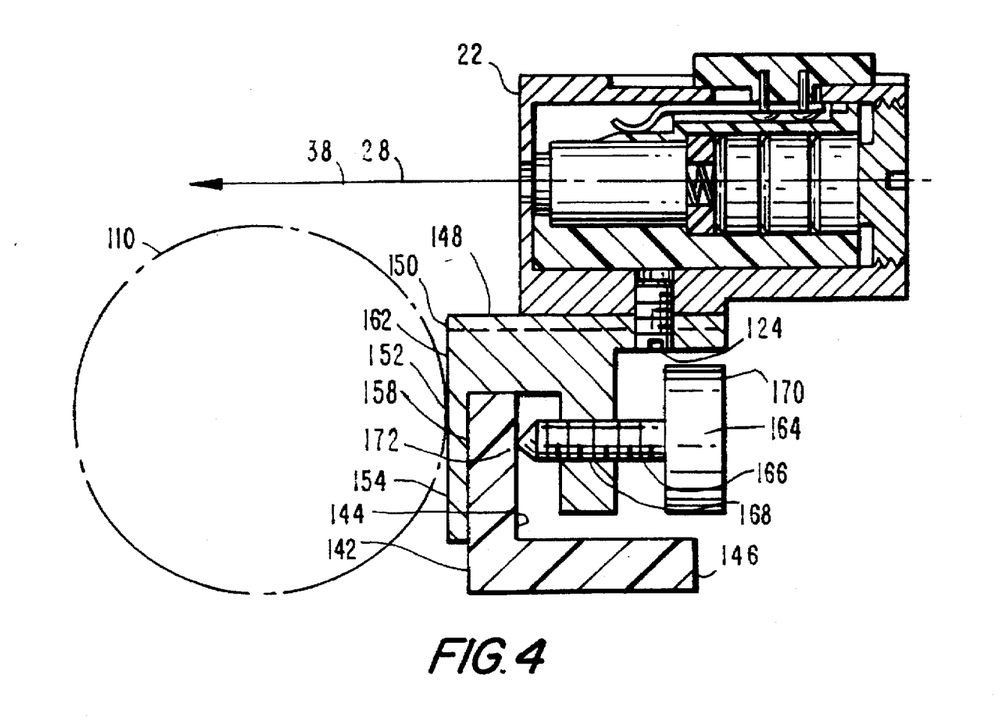
FIG. 4 is a sectional view of the second putter head shown in FIG. 3 taken along lines 4—4.

The second selected golf apparatus shown in FIGS. 3 and 4 comprises second putter head 140 having a transversely extending generally planar front face 142 for impacting the golf ball 110 and a generally planar rear portion 144 formed substantially parallel to the front face 142 and spaced apart therefrom. The golf ball 110 is illustrated in phantom adjacent the front face 142 in position to be putted. Also included as part of the second putter head 140 is a horizontal rear portion 146 formed normal to the front face 142. A second support member 148 is illustrated in FIGS. 3 and 4 defining a second upper portion 150 having a similar screw 124, tongue 126 and groove 128 arrangement, as described above, for removably affixing it to the laser housing 22. The second support member 148 may be fabricated by similar methods using similar materials as those described in detail above for fabricating the first support member 118. At least one tab 152 is defined by a second lower portion 154 which engages the front face 142 of the second putter head 140. The tab 152 provides a planar alignment surface 158 which is perpendicular to the axis 38 of the bore 24 and which contacts the front face 142 thereby aligning the axis 38 substantially perpendicular to the front face 142. On a front surface 160 of the tab 152 there is a generally planar tab face 162 formed substantially parallel to the plane of the alignment surface 158 and which impacts the golf ball 110 when the laser housing 22 is affixed to the second putter head 140. A clamping screw 164 having a male threaded section 166 threadedly engages the second support member 148 in which there is a mating female threaded section 168. By rotating a knob 170 which is formed as part of the clamping screw 164, the player tightens a cone point 172 of the clamping screw 164 against the generally planar rear portion 144. The force of the cone point 172 against the rear portion 144 urges the alignment surface 158 against the front face 142 such that the second support member 148 is securely clamped and aligned with respect to the front face 142 thereby ensuring that the laser aiming beam 28 is emitted in a predetermined optimum direction substantially perpendicular to the front face 142. The mounting arrangement provided by the second support member 148 permits the player to adjust the laser housing 22 in a transverse direction along the second putter head 140 and thereby clamp the laser device 20 at a location above the front face 142 where he or she prefers to impact the golf ball 110.

Figure 5:
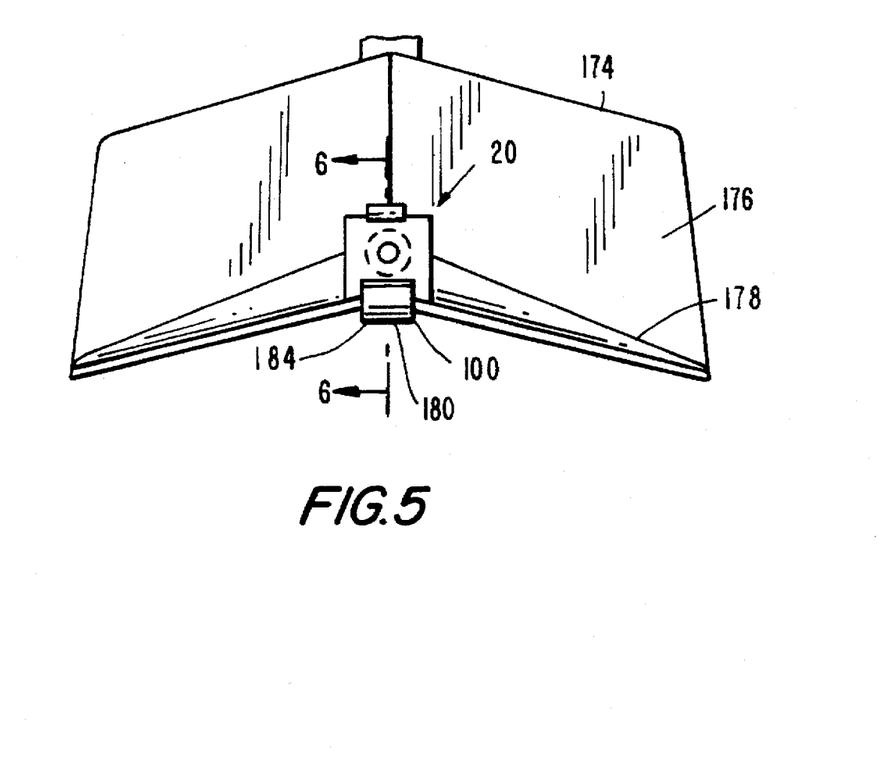
FIG. 5 is a front elevation of a golf hat having a self-contained laser device mounted thereon by means of a third support member.
Figure 6:
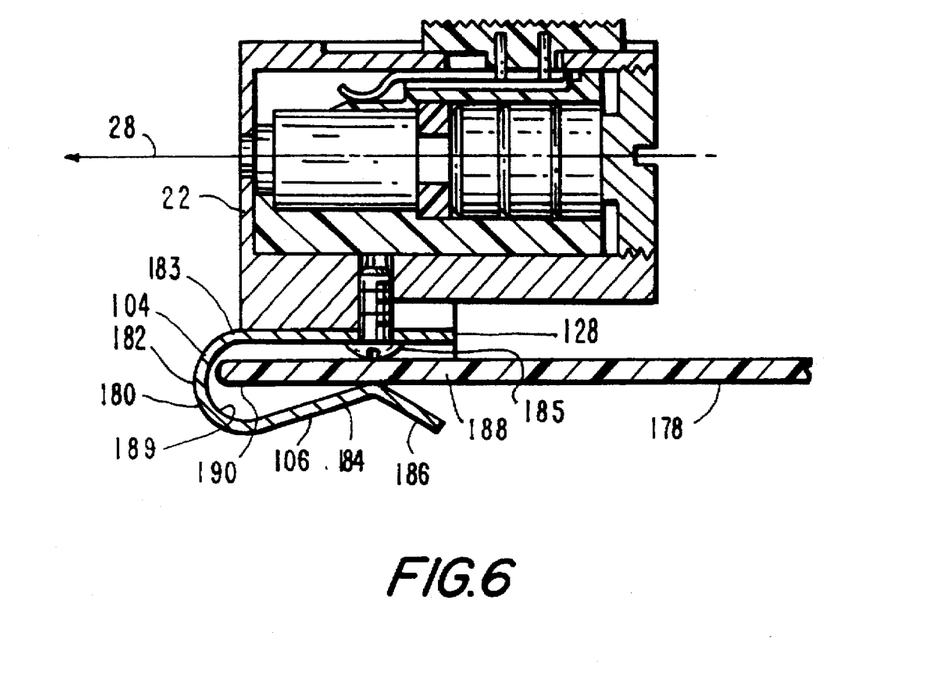
FIG. 6 is a fragmentary sectional view of the golf hat shown in FIG. 5 taken along the lines 6—6.

The third selected golf apparatus shown in FIGS. 5 and 6 is a golf hat 174, typical of those used by golfers, having a cap portion 176 and a sun visor portion 178. A third support member 180 defining a C-shaped clasp including a tongue-like third upper portion 183 which fits snugly into the groove 128 and a third lower portion 184 which grips the sun visor 178 is used to removably affix the laser device 20 on the sun visor 178. The third support member 180 is affixed to the laser housing 22 preferably by a round head screw 185 and is aligned thereto by the close fit of the tongue-like upper portion 183 in the groove 128. The third lower portion 184 is a resilient spring element 186 which is adapted to apply a biased force to the sun visor 178 thereby frictionally gripping the sun visor 178 between the third lower portion 184 and a bottom side 188 of the laser housing 22. When installing the laser device 20 on the sun visor 178, the player urges the laser device 20 rearwardly so that an inside surface 189 of the third support member 180 contacts a front edge 190 of the sun visor 178 thereby aligning the laser device 20 such that the laser beam 28 is emitted in a predetermined optimum direction with respect to the sun visor 178 forwardly of the visor 178 substantially perpendicular to the front edge 190.

During practice, the laser device 20 is affixed to the golf hat 174 such that the player wearing the hat may monitor his or her head movement during a golf stroke by observing the movement of a laser dot (not shown) projected on the ground by the laser device 20 affixed to their hat 174. When addressing the ball, the player locates his or her initial head position by observing the location of the laser dot on a target point (not shown) on the ground. It has been determined that small angular adjustments of the hat 174, while fitted on the player's head, provide sufficient aiming flexibility so that the player may aim the laser beam 28 at the desired target point on the gound adjacent the ball 110 when preparing to strike the ball 110. By observing the movement of the dot while swinging the club, the player determines his head motion during the swing.

Figure 7:
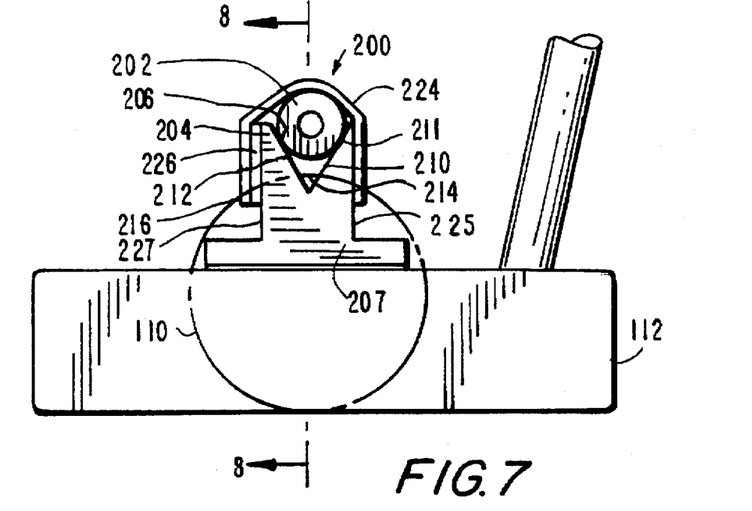
FIG. 7 is a front elevation of the first putter head having a laser pointer mounted thereon by means of an adapter.
Figure 8:
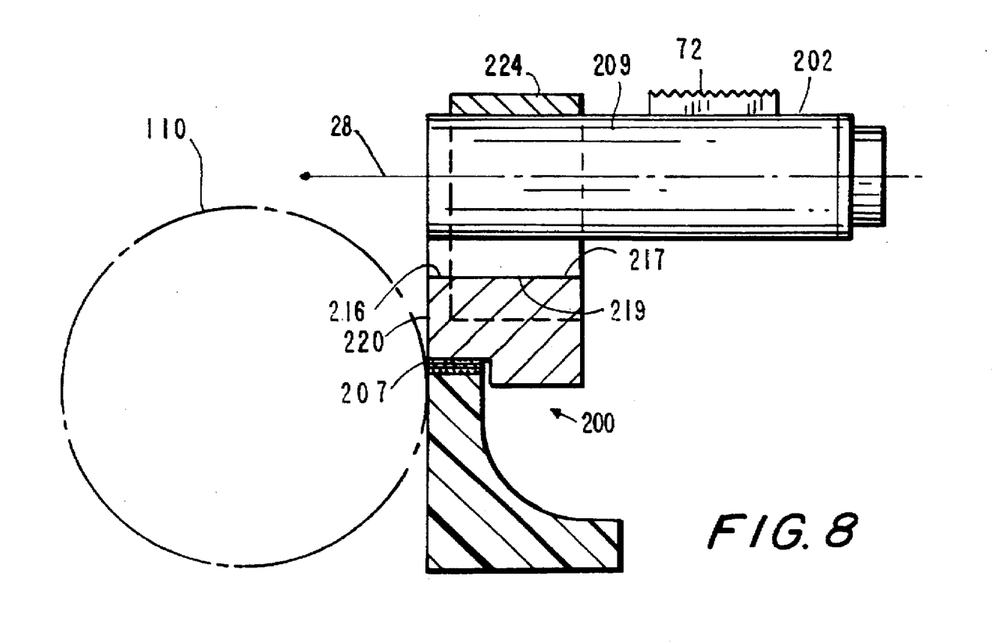
FIG. 8 is a sectional view of the first putter head shown in FIG. 7 taken along lines 8—8.

Turning now to FIGS. 7 and 8, in the drawings there is shown a second embodiment of the present invention offering certain variations over the first embodiment. In the second embodiment, the laser source may be any one of a number of self-contained, laser pointers having an on-off switch included as part of the pointer. The second embodiment employs various adapters having means, such as a hook and pile, for quickly attaching and detaching the laser pointer to and from the various adapters which are used for mounting the laser pointer on a selected golf apparatus.

The first selected golf apparatus illustrated in FIGS. 7 and 8 is the first putter head 112 described in detail above having affixed thereto an adapter, generally referred to by reference number 200. The adapter 200 is described in detail below and includes a top segment 204 having a nest 206 in which a laser pointer 202 is mounted and having a bottom segment 207 adapted to removably affix the pointer 202 on a selected golf apparatus.

Referring to FIGS. 7 and 8, the laser pointer 202 of the second embodiment is similar to the laser device 20 of the first embodiment, as previously described, and includes a cylindrical casing 209 having the laser module 26 mounted therein with the voltage source 40 and the switch 72. The aforementioned components cooperate in a manner similar to that in which the components of the laser device 20 shown in FIG. 2 cooperate, and for the sake of clarity are not illustrated in detail again in FIG. 8. The nest 206 is a V-shaped groove 210 defined by a first generally planar surface 211 disposed at an angle 214 with respect to a second generally planar surface 212 wherein the planar surfaces 211 and 212 intersect at the base 216 of the groove 210 forming a line 217 which, in this disclosure, is defined as the axis 219 of the nest 206 and which is formed perpendicular to a generally planar reference surface 220 on the bottom segment 207. A relatively long hook and pile strip 224 is attached to a first side 225 of the adapter 200 by any one of a number of well known methods and, in like manner, a relatively short hook and pile strip 226 is attached to a second side 227. As shown in FIGS. 7 and 8, the long hook and pile strip 224 is pulled tightly over the laser pointer 202 and is pressed into engagement with the short hook and pile strip 226 thereby securing and positioning the laser pointer 202 in the nest 206 such that the laser beam 28 emitted by the laser pointer 202 is projected parallel to the axis 219 of the nest 206.

Those skilled in the art will recognize that the V-shaped groove 210 in combination with the strips 224 and 226 can accomodate laser pointers 202 having cylindrical casings 209 of different diameters such that the laser beam 28 projected by any one of the various pointers is aimed parallel to the axis 219 of the nest 206. The adapter 200 may be formed with different bottom segments 207 adapted to removably affix the adapter 200 to each selected golf apparatus previously described. Three adapters may be fabricated with the first 132, second 154 and third 184 lower portions as bottom segments such that each adapter 200 may be mounted on first 112, second 140 and third 174 selected golf apparatus, respectively, and to avoid needless repetition are not described again.

Turning now to FIGS. 9 through 15, in the drawings there is illustrated a third embodiment of the present invention offering certain variations over the previous embodiments. Principally, the laser source in the third embodiment-may be any one of a number of typical self-contained, pen-like laser pointers Which is adapted to not only be utilized as a general-purpose, pen-like laser pointer but also to be used as a laser source for laser devices employed in the practice of golf. The third embodiment includes various types of pointers and various pointer enclosures for affixing and aligning the various laser pointers on selected golf apparatus thereby providing the player the flexibility of using his or her relatively costly hand held pointer for enhancing different aspects of his or her golf game by mounting the laser pointer on a selected golf apparatus such as a putter and/or a hat. In addition, the various pointer enclosures of the third embodiment provide protection against the ambient environment for the laser pointers mounted within the enclosures.

Figure 9:
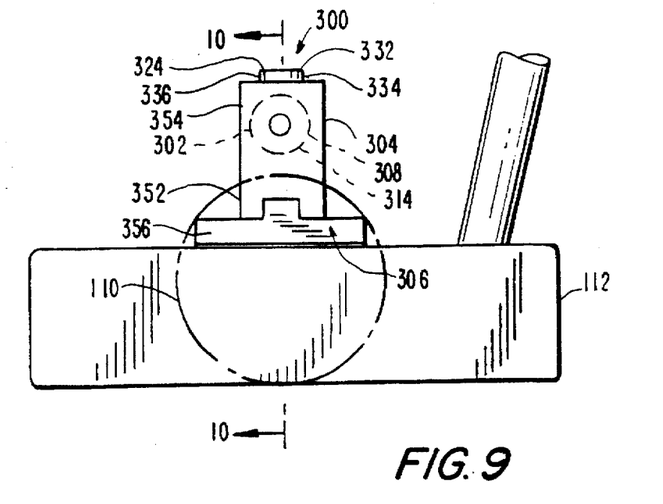
FIG. 9 is a front elevation of the first putter head having a pen-like laser pointer mounted thereon by means of a first pointer enclosure.
Figure 10:
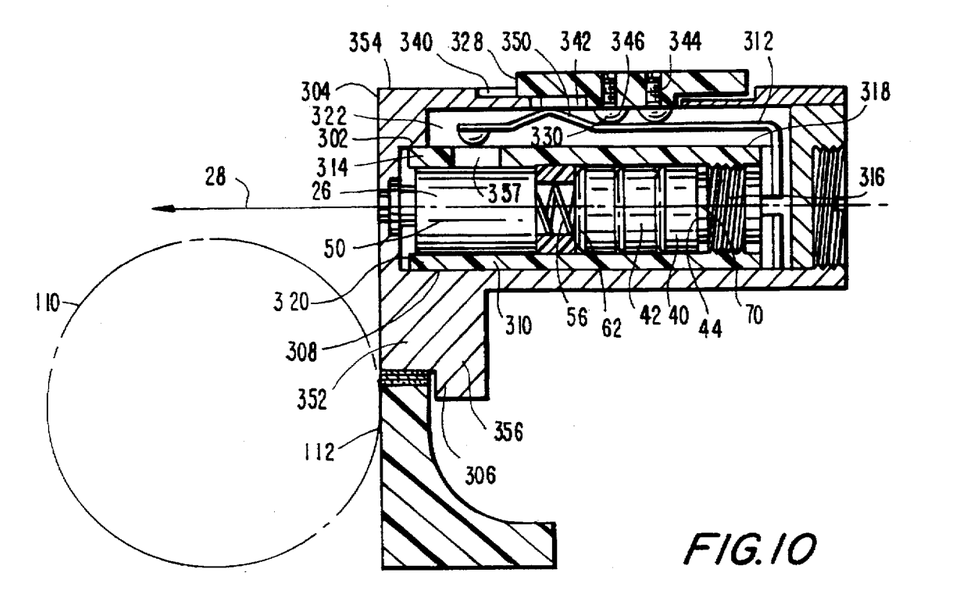
FIG. 10 is a sectional view of the first putter head shown in FIG. 9 taken along lines 10—10.

The first select golf apparatus illustrated in FIGS. 9 and 10 is the first putter head 112 described in detail above and which is shown in FIGS. 9 and 10 having affixed thereto a pointer enclosure generally referred to by reference number 300. The pointer enclosure 300 is described in detail below and includes a top portion 304 having a bore 308 in which a typical pen-like laser pointer 302 is mounted and a bottom portion 306 adapted to removably affix the pointer enclosure 300 to the select golf apparatus.

Referring to FIGS. 9 and 10, the typical pen-like laser pointer 302 of the third embodiment comprises a substantially cylindrical casing 310, the laser module 26, the voltage source 40 and a pocket clip switch 312 for controlling the typical pen-like laser pointer 302. The aforementioned components cooperate in a similar manner as the manner in which the components of the laser device 20 shown in FIG. 2 cooperate and, where applicable, are referred to with the same reference numbers as in FIG. 2. FIGS. 9 and 10 illustrate a first pen-like laser pointer 314 having an insulative casing 320 formed from an electrically insulative plastic resin by well known manufacturing processes. The laser module 26 is mounted in the insulative casing 320 and its electrically conductive shell 50 fits snugly within the insulative casing 320. Similarly, each battery 42 is mounted within the insulative casing 320 such that each positive pole 44 intimately contacts the insulative casing 320. Because the casing 320 is formed from an insulative material, each battery 42 is electrically isolated from the shell 50 and both the shell 50 and each battery 42 are electrically insulated from the pointer enclosure 300.

As shown in FIGS. 9 and 10, the negative terminal 56 of the laser module 26 contacts the negative termination 62 of the voltage source 40. The pocket clip switch 312, preferably formed from a resilient electrically conductive material, communicates with the positive termination 70 of the voltage source 40 through an end cap 316 threadedly engaged in the rear end 318 of the casing 310 and in a normally open position, the pocket clip switch 312 is spaced apart from the shell 50. When the pocket clip 312 is operated, that is, moved into a position to electrically communicate with the shell 50, the pocket clip 312 electrically connects the positive termination 70 of the voltage source 40 to the shell 50 thus forming the series electrical connection between the laser module 26 and the voltage source 40 thereby turning on the laser module 26.

The pocket clip switch 312 operates in a channel 322 formed adjacent the bore 308. A cam switch 324 is located adjacent the channel 322 and may be activated by the player's thumb to turn on and turn off the laser aiming beam 28. The cam switch 324 comprises a slide element 328, preferably fabricated from a plastic resin, and a rivet-like cam element 330 which may be formed from either a metallic alloy or a resinous plastic material using known manufacturing processes. The slide element 328 has a serrated top surface 332 and first 334 and second 336 laterally extending parallel sides which fit slidably in a guideway 340 formed in the pointer enclosure 300. Also formed in the pointer enclosure 300 is a guide slot 342 in which a lower section 344 of the slide element 328 is guided. The slide element 328 is retained in the guide slot 342 by the rivet-like cam element 330.

As shown in FIGS. 9 and 10, a head 346 formed on the cam element 330 operates in the channel 322. When the slide element 328 is moved forward from its off position to turn on the laser module 26, the head 346 engages a cam surface 350 formed in the pocket clip switch 312 and urges the pocket clip switch 312 downwardly into biased contact with the shell 50 thereby completing the series electrical circuit between the voltage source 40 and the laser module 26 so as to turn on the laser aiming beam 28. In reverse manner, the aiming beam 28 is turned off by moving the cam switch 324 back to the off position wherein the pocket clip switch 312 is spaced apart and electrically isolated from the shell 50.

The pointer enclosure 300 may be manufactured from any one of a number of materials such as either an electrically conductive metallic alloy or an insulative plastic resin. Manufactruing processes such as numerically controlled machining or standard die casting techniques may be used to fabricate a first conductive pointer enclosure 352 as shown in FIG. 10 having formed therein, with substantial precision, the bore 308 in a first enclosure top portion 354 for mounting the first pen-like laser pointer 314 therein, and in a first enclosure bottom portion 356 thereof, means for mounting and aligning the first conductive pointer enclosure 352 on the first putter head 112. Insulative pointer enclosures (not shown) having substantially the same shape and precision as the conductive pointer enclosures may be fabricated using resinous plastic materials and well known plastic molding processes.

FIGS. 9 and 10 illustrate the first pen-like laser pointer 314 having the insulative casing 320 installed in the bore 308 of the first conductive pointer enclosure 352. In this arrangement, the insulative casing 320 electrically isolates the shell 50 from the first conductive pointer enclosure 352. As previously described, the first pen-like laser pointer 314 is turned on by operating the pocket clip switch 312 thereby connecting the positive termination 70 to the shell 50 by establishing contact with the shell 50 through an opening 357 in the insulative casing 320.

Figure 11:
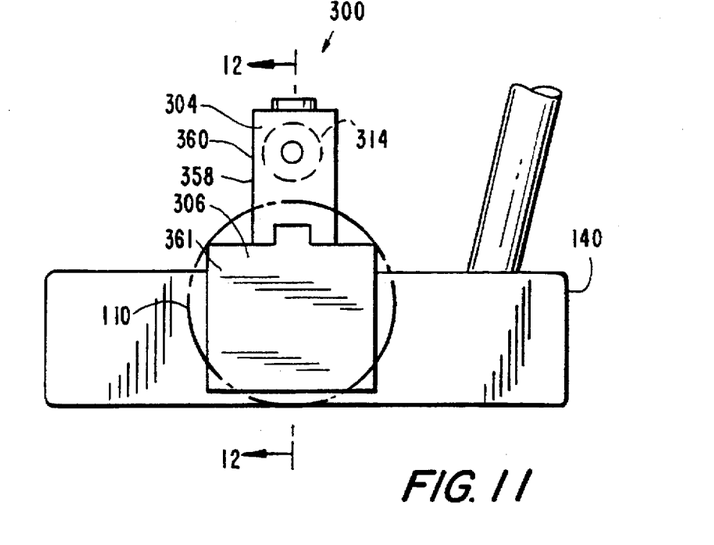
FIG. 11 is a front elevation of the second putter head having a pen-like laser pointer mounted thereon by means of a second pointer enclosure.
Figure 12:
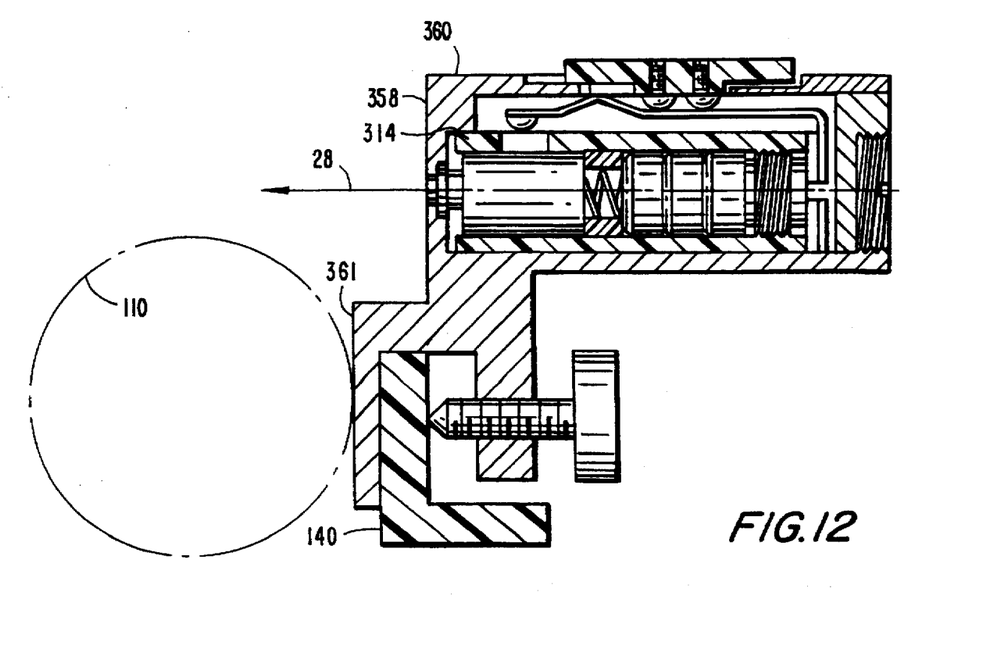
FIG. 12 is a sectional view of the second putter head shown in FIG. 11 taken along lines 12—12.

FIGS. 11 and 12 illustrate a second conductive pointer enclosure 358 removably affixed to the second putter head 140 wherein the second pointer enclosure 358 includes a second enclosure top portion 360, similar to the first enclosure top portion 354, having mounted therein the first pen-like laser pointer 314. A second enclosure bottom portion 361 removably affixes the second conductive pointer enclosure 358 to the second putter head 140.

Figure 13:
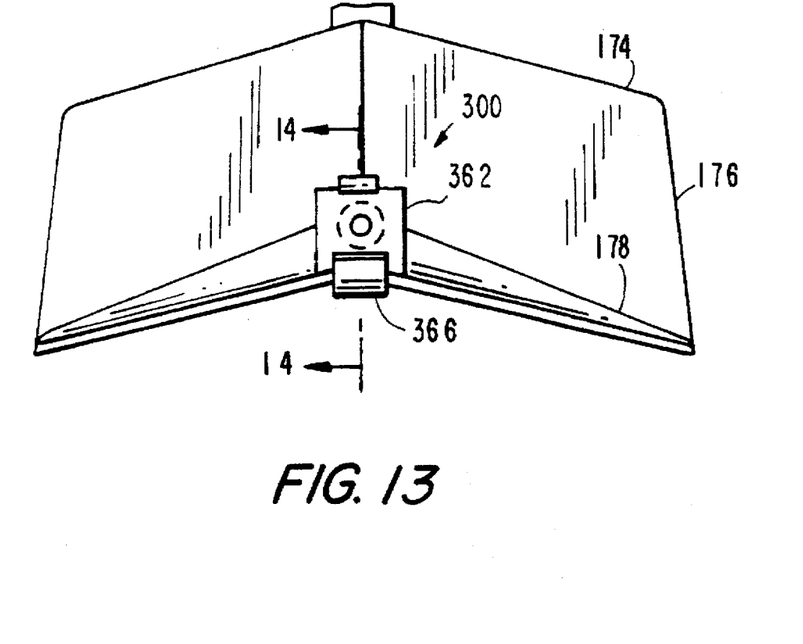
FIG. 13 is a front elevation of the golf hat having a pen-like laser pointer mounted thereon by means of a third pointer enclosure.
Figure 14:
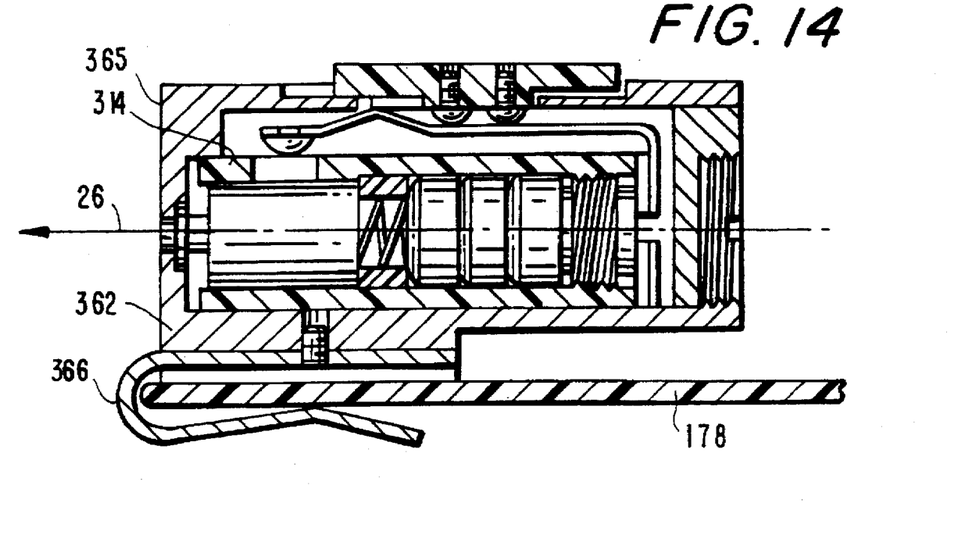
FIG. 14 is a fragmentary sectional view of the golf hat shown in FIG. 13 taken along the lines 14—14.

FIGS. 13 and 14 illustrate a third conductive pointer enclosure 362 removably affixed to the golf hat 174 wherein the third pointer enclosure 362 includes a third enclosure top portion 365, similar to the first enclosure top portion 354, having mounted therein the first pen-like laser pointer 314. A third enclosure bottom portion 366 removably affixes the third conductive pointer enclosure 362 to the golf hat 174.

Figure 14A:
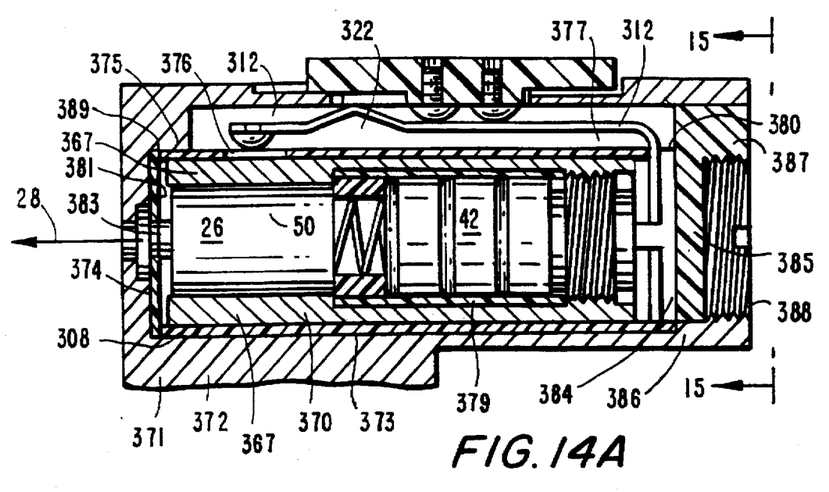
FIG. 14A is an exploded fragmentary sectional view of an upper portion of a fourth pointer enclosure showing an alternate arrangement for the upper portion of the third pointer enclosure shown in FIG. 14.

FIG. 14A is an enlarged fragmentary view of an alternate arrangement of that which is shown in FIG. 14 and illustrates a second pen-like laser pointer 367 similar to the first pen-like laser pointer 302 (FIG. 10) but having a conductive casing 370, preferably formed from metallic tubing, installed in a fourth enclosure top portion 372 of a fourth conductive pointer enclosure 371. In this alternate arrangement, an insulating tube 373, an insulating spacer 374 and an end cap 385 are provided to electrically insulate the second pen-like laser pointer 367 and, thus, the shell 50 from the fourth conductive pointer enclosure 371. The insulating tube 373 is a thin wall tubular member formed from an insulative material, preferably a plastic resin, manufactured by employing any one of a number of processes such as molding or extruding. Also shown in FIG. 14A is a battery tube 379 formed in a manner similar to the manner in which the insulating tube 373 is formed and employed to isolate each battery 42 from the conductive casing 370. The batteries 42 and the pocket clip switch 312 cooperate similarly to the manner in which they cooperate in the first pen-like laser pointer 302, as described above, and for the sake of brevity is not described again. A first end 375 of the insulating tube 373 includes an opening 376 through which the pocket clip switch 312 operates to contact the conductive casing 370 which, in turn, electrically contacts the shell 50 thereby turning on the laser module 26. A second end 377 of the insulating tube 373 includes a clearance notch 380 for the pocket clip switch 312.

Electrically isolating a front side 381 of the laser pointer 367 from the fourth conductive pointer enclosure 371 is the disc-like insulating spacer 374 which fits closely in a front side 389 of the bore 308. Included in the insulating spacer 374 is an opening 383 through which the laser beam 28 is emitted. Electrically isolating a rear laser pointer e second pen-like laser pointer 367 from the fourth pointer enclosure 371 is a disc-like end cap 385 preferably formed from a plastic resin using known processes.

As shown in FIG. 14A, the end cap 385 slidably fits into a threaded rear side 386 of the bore 308 and includes a projection 387 which fits snugly in the channel 322 thereby sealing the rear side 386 from the ambient environment. A screw cap 388 is threadedly inserted in the rear side 386 applying a biased force to the end cap 385 thereby retaining the second pen-like laser pointer 367 in the fourth conductive pointer enclosure 371.

Figures 14B, 15:
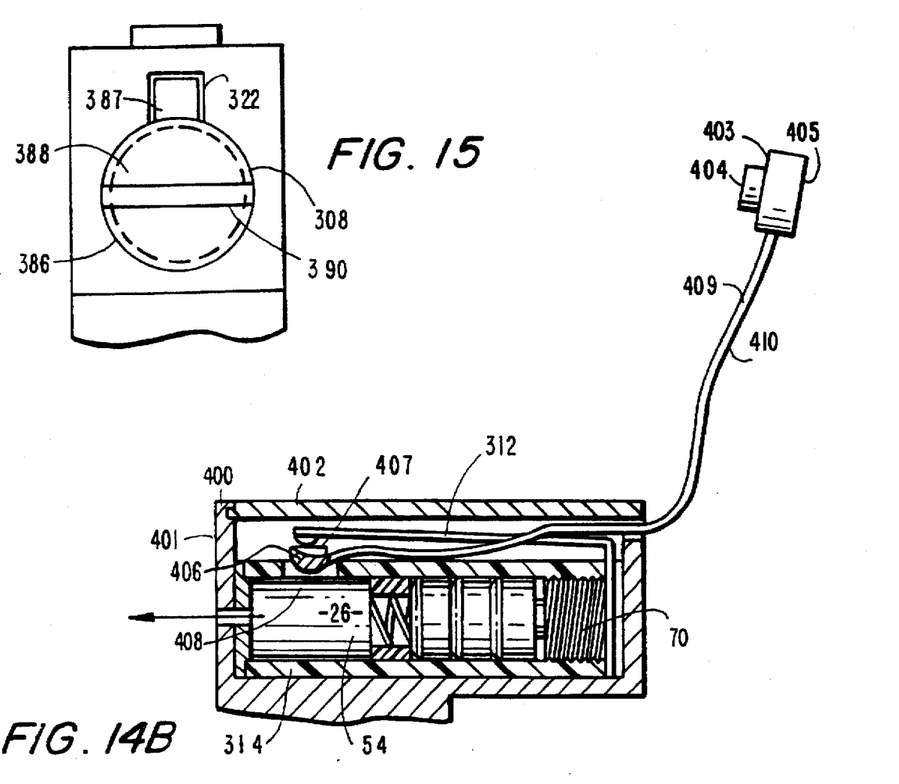
FIG. 14B is an exploded fragmentary sectional view of an upper portion of a fifth pointer enclosure showing an alternate arrangement for the upper portion of the third pointer enclosure shown in FIG. 14.
FIG. 15 is a fragmentary rear elevation of the upper portion of the fourth pointer enclosure shown in FIG. 14A taken along the lines 15—15.

FIG. 15 illustrates the projection 387 fitting snugly in the channel 322 and a screw driver slot 390 which may be used to tighten the screw cap 388 into the threaded rear side 386 of the bore 308.

In FIGS. 9 through 14, the bottom portions 356, 361 and 366 of the first 352, second 358 and third 362 conductive pointer enclosures are similar to the lower portions 132,154 and 184 of the first 118, second 148 and third 180 support members, respectively, as illustrated in FIGS. 1 through 6 and as described in detail above. The manner in which the aforementioned bottom portions of the conductive pointer enclosures cooperate with the first 112, second 140 and third 174 select golf apparatus upon which they are mounted, respectively, is similar to the manner in which the aforementioned lower portions of the support members cooperate with the golf apparatus upon which they are mounted, respectively, as described in detail above. To avoid needless repetition, the manner in which they cooperate is not described again. In FIG. 14A, the fourth top portion 372 described above may also be adapted with first 132, second 154 and third 184 lower portions to removably affix the fourth top portion on the first 112, second 140 and third 174 select golf apparatus previously described and to avoid needless repetition the manner in which they cooperate is not described again.

FIG. 14B illustrates a fifth enclosure 400 having a fifth top portion 401. Certain golfers may prefer to activate the first pen-like laser pointer 314 remotely by operating a bipolar button switch 403 affixed to a grip of a golf club (not shown) rather than by operating the slide switch 324 (FIG. 9). Those skilled in the art will recognize that the bipolar button switch 403 having two normally disconnected poles (not shown) is available from any one of a number of well known suppliers of switches such as Micro Switch, a Honeywell Division, Freeport, Ill. Preferably, the button switch 403 is attached to the grip using a strip of hook and pile 405 which is pressed into engagement with a strip of hook and pile (not shown) mounted on the grip. Interposed between the pocket clip 312 and the positive terminal 54 is a contact element 406 such that a first contact surface 407 communicates with the pocket clip 312 and a second contact surface 408 communicates with the positive terminal 54. As previously mentioned, the pocket clip 312 communicates with the positive termination 70. First 409 and second 410 insulated conductors connect the first 407 and second 408 contact surfaces to the first and second switch poles, respectively, of the bipolar switch 403. When a button 404 is depressed, the switch poles of the switch 403 are electrically connected, thus, connecting the positive terminal 54 to the positive termination 70 thereby turning on the laser module 26. In like manner, the contact element 406 and the button switch 403 may be employed to activate the second laser pointer 367 illustrated in FIG. 14A. Also shown in FIG. 14B is a snap-on cover 402 which retains the laser pointer 314 in the enclosure 400.

It is also to be understood that the present invention is not limited to the precise details of structure shown and set forth in this specification for obvious modifications will occur to those skilled in the art to which the invention pertains.

What is claimed is:

1. A self-contained laser device removably affixed on selected golf apparatus, said laser device comprising:
   a laser housing having a bore in which a laser module is mounted such that said laser module emits a laser beam through an opening in said bore coincident with the axis of said bore;
   means within said bore for activating said laser module;
   a support member having an upper and a lower portion;
   said lower portion including means for removably affixing and aligning said support member on said selected golf apparatus; and
   said upper portion including means for removably affixing and aligning said laser housing on said support member such that when said laser device is removably affixed to said selected golf apparatus said laser beam is emitted in a predetermined optimum direction with respect to said select golf apparatus.

2. A laser device in accordance with claim 1 wherein said select golf apparatus comprises a first putter head defining a transversely extending generally planar front surface for striking a golf ball, and said support member comprises a first support member having a first lower portion comprising at least one generally planar reference surface positioning said laser device relative to said front surface so that when said laser device is removably affixed to said first putter head said laser beam is emitted substantially perpendicular to said front surface.

3. A laser device in accordance with claim 2 wherein said first support member is affixed to said first putter head by an adhesive interface.

4. A laser device in accordance with claim 2 wherein said laser device is removably affixed to said first putter head such that said laser beam is emitted above a point on said front surface where said golf ball is positioned to be putted so that said laser beam is emitted above said golf ball to be putted.

5. A laser device in accordance with claim 1 wherein said selected golf apparatus comprises a second putter head defining a transversely extending generally planar front face for striking said golf ball and a generally planar rear portion formed substantially parallel to said front face and spaced apart therefrom and said support member comprises a second support member having a second lower portion including at least one mounting tab defining a generally planar alignment surface adapted to engage said front face; and at least one clamping means affixed to said second lower portion so that when said clamping means is positioned into biased contact with said rear portion for removably affixing said laser device to said second putter head said laser beam is emitted substantially perpendicular to said front face.

6. A laser device in accordance with claim 5 wherein said laser device is removably affixed to said second putter head such that said laser beam is emitted above a point on said front face where said golf ball is positioned to be putted so that said laser beam is emitted above said golf ball to be putted.

7. A laser device in accordance with claim 1 wherein said selected golf apparatus is a golf hat including a sun visor and said support member is a third support member having a third lower portion comprising a clasp adapted to grip said sun visor such that when said laser device is removably affixed to said golf cap said laser beam is projected forwardly of said hat substantially perpendicular to a front edge of said visor.

8. A self-contained laser device mounted on a selected golf apparatus, said laser device comprising:
 a laser pointer having a laser module, a voltage source and a switch, said switch turning on said laser module to emit a laser beam;
 a pointer enclosure having a bore adapted to removably affix said laser pointer therein so that said laser beam is emitted through an opening in said bore coincident with the axis of said bore;
 means for activating said switch included in said pointer enclosure; and
 said pointer enclosure defining means for mounting said laser device on said selected golf apparatus such that when said laser device is mounted on said selected golf apparatus said laser beam is emitted in a predetermined optimum direction with respect to said select golf apparatus.

9. A laser device in accordance with claim 8 wherein said select golf apparatus is a first putter head defining a transversely extending generally planar front surface for striking a golf ball and said pointer enclosure is a first pointer enclosure comprising at least one generally planar reference surface positioning said laser device relative to said front surface so that when said laser device is mounted on said first putter head said laser beam is emitted substantially perpendicular to said front surface.

10. A laser device in accordance with claim 9 wherein said first pointer enclosure is affixed to said first putter head by an adhesive interface.

11. A laser device in accordance with claim 9 wherein said laser device is affixed to said first putter head such that said laser beam is emitted above a point on said front surface where said golf ball is positioned to be putted so that said laser beam is emitted above said golf ball to be putted.

12. A laser device in accordance with claim 8 wherein said select golf apparatus comprises a second putter head defining a transversely extending generally planar front face for striking said golf ball and a generally planar rear portion formed substantially parallel to said front face and spaced apart therefrom and said pointer enclosure is a second pointer enclosure comprising: at least one mounting tab defining a generally planar alignment surface adapted to engage said front face; and at least one clamping means affixed to said second pointer enclosure so that when said clamping means is positioned into biased contact with said rear portion removably affixing said laser device to said second putter head, said laser beam is emitted substantially perpendicular to said front face.

13. A laser device in accordance with claim 12 wherein said laser device is removably affixed to said second putter head such that said laser beam is emitted above a point on said front face where said golf ball is positioned to be putted so that said laser beam is emitted above said golf ball to be putted.

14. A laser device in accordance with claim 8 wherein said select golf apparatus comprises a golf hat including a sun visor and said pointer enclosure is a third pointer enclosure having a clasp attached thereto adapted to grip said sun visor such that when said laser device is removably affixed to said golf cap, said laser beam is projected forwardly of said hat substantially perpendicular to a front edge of said visor.

15. An enclosure removably mounting a pen-like laser pointer on a selected golf apparatus, said laser pointer including a casing, a laser module emitting a laser beam, a voltage source and a switch controlling said laser pointer, said enclosure comprising:
 an upper portion and a lower portion;
 said upper portion forming an inner cavity having a bore including access means for receiving said laser pointer therein;
 an opening in a front side of said bore;
 said bore adapted to removably mount said laser pointer therein such that said laser beam is emitted through said opening;
 means for retaining said laser pointer and means for activating said switch located in said upper portion; and
 means included in said lower portion for affixing said enclosure to select golf apparatus such that when said laser pointer is removably affixed to maid select golf apparatus said laser beam is emitted in a predetermined optimum direction with respect thereto.

16. An enclosure in accordance with claim 15 wherein said laser pointer is installed in said inner cavity and removed therefrom through an access opening in said bore.

17. An enclosure in accordance with claim 16 wherein said laser pointer mounted therein is retained in said inner cavity by a cap inserted in said access opening.

18. An enclosure in accordance with claim 15 wherein said switch is positioned in said inner cavity; said inner cavity including a channel communicating with said bore, said channel defining a portion of said inner cavity within which said switch is operated to control said laser pointer.

19. An enclosure in accordance with claim 15 wherein said laser module includes first and second conductive means coupling opposite polarity potentials, a first pole and a second pole from said voltage source to said laser module to cause said laser module to emit said laser beam, said second conductive means and said second pole being insulated from said casing wherein said second pole and said second conductive means are electrically connected; said switch defining an electrically conductive pocket clip communicating with said first pole and being spaced apart from said first conductive means; said enclosure further comprising a cam switch positioned adjacent said pocket clip, said cam switch operating said pocket clip in order to electrically connect said first conductive means to said first pole to turn on said laser module.

20. An enclosure in accordance with claim 19 wherein said enclosure is formed from electrically conductive material and said casing is formed from electrically insulative material so that said first conductive means is electrically insulated from said voltage source until said pocket clip is operated connecting said first conductive means to said first pole through an opening in said insulative casing thereby turning on said laser module.

21. An enclosure in accordance with claim 19 wherein said enclosure is formed from electrically conductive material, said casing is formed from electrically conductive material and said enclosure further comprises insulative means for electrically insulating said first conductive means from said voltage source until said pocket clip is operated connecting said first conductive means to said first pole by said pocket clip contacting said conductive casing thereby turning on said laser module.

22. An enclosure in accordance with claim 15 wherein said laser module includes first and second conductive means coupling opposite polarity potentials, a first pole and a second pole from said voltage source to said laser module to cause said laser module to emit said laser beam, said second conductive means and said second pole being insulated from said casing wherein said second pole and said second conductive means are electrically connected; said switch comprising an electrically conductive switch element communicating with said first pole and being spaced apart from said first conductive means, said enclosure further comprising a contact element having first and second contact surfaces insulated from each other and interposed between said switch element and said first conductive means; a button switch having first and second switch poles connected by first and second wires to said first and second contact surfaces, respectively, such that when said button switch is operated connecting said switch poles, said first contact surface is electrically connected to said second contact surface thereby connecting said first conductive means to said first pole turning on said laser module.

* * * * *